United States Patent
Maga et al.

(10) Patent No.: US 8,712,828 B2
(45) Date of Patent: Apr. 29, 2014

(54) CHURN PREDICTION AND MANAGEMENT SYSTEM

(75) Inventors: Matteo Maga, Milan (IT); Paolo Canale, Rome (IT); Astrid Bohe, Kronberg (DE)

(73) Assignee: Accenture Global Services Limited, Dublin (IE)

( * ) Notice: Subject to any disclaimer, the term of this patent is extended or adjusted under 35 U.S.C. 154(b) by 2947 days.

(21) Appl. No.: 11/347,141

(22) Filed: Feb. 3, 2006

(65) Prior Publication Data

US 2007/0156673 A1    Jul. 5, 2007

(30) Foreign Application Priority Data

Dec. 30, 2005  (EP) ..................................... 05425946
Dec. 30, 2005  (IT) .......................... MI2005A002526

(51) Int. Cl.
*G06Q 10/00*    (2012.01)

(52) U.S. Cl.
USPC .................................. 705/10; 705/7; 705/14

(58) Field of Classification Search
USPC ................................................. 705/7, 10, 14
See application file for complete search history.

(56) References Cited

U.S. PATENT DOCUMENTS

| | | | | |
|---|---|---|---|---|
| 6,012,058 | A | 1/2000 | Fayyad et al. ...................... | 707/6 |
| 6,049,599 | A | 4/2000 | McCausland et al. | |
| 6,449,612 | B1 | 9/2002 | Bradley et al. ..................... | 707/6 |
| 6,470,335 | B1* | 10/2002 | Marusak ................ | 1/1 |
| 6,542,881 | B1 | 4/2003 | Meidan et al. .................. | 706/45 |
| 6,675,164 | B2 | 1/2004 | Kamath et al. ..................... | 707/6 |
| 6,728,728 | B2 | 4/2004 | Spiegler et al. ............... | 707/103 |
| 6,836,773 | B2 | 12/2004 | Tamayo et al. .................... | 707/6 |
| 7,698,163 | B2* | 4/2010 | Reed et al. ....................... | 705/10 |
| 2002/0165755 | A1* | 11/2002 | Kitts ............................... | 705/10 |
| 2003/0200135 | A1* | 10/2003 | Wright ............................ | 705/10 |
| 2003/0208468 | A1 | 11/2003 | McNab et al. .................... | 707/1 |
| 2004/0034558 | A1* | 2/2004 | Eskandari ........................ | 705/10 |

(Continued)

FOREIGN PATENT DOCUMENTS

| | | |
|---|---|---|
| EP | 1 168 198 A2 | 1/2002 |
| WO | WO 2001/22265 A2 | 3/2001 |
| WO | WO 01/29692 A2 | 4/2001 |

OTHER PUBLICATIONS

Kleissner, C., "Data mining for the enterprise", *System Sciences*, Proceedings of the Thirty-First Hawaii International Conference on Kohala Coast, HI, vol. 7, Jan. 6, 1998, pp. 295-304.

(Continued)

*Primary Examiner* — Nga B. Nguyen
(74) *Attorney, Agent, or Firm* — Brinks Gilson & Lione

(57) ABSTRACT

A system and method for managing churn among the customers of a business is provided. The system and method provide for an analysis of the causes of customer churn and identifies customers who are most likely to churn in the future. Identifying likely churners allows appropriate steps to be taken to prevent customers who are likely to churn from actually churning. The system included a dedicated data mart, a population architecture, a data manipulation module, a data mining tool and an end user access module for accessing results and preparing preconfigured reports. The method includes adopting an appropriate definition of churn, analyzing historical customer to identify significant trends and variables, preparing data for data mining, training a prediction model, verifying the results, deploying the model, defining retention targets, and identifying the most responsive targets.

11 Claims, 7 Drawing Sheets

(56) References Cited

U.S. PATENT DOCUMENTS

| | | | |
|---|---|---|---|
| 2004/0039593 A1 | 2/2004 | Eskandari | |
| 2004/0073520 A1* | 4/2004 | Eskandari | 705/400 |
| 2005/0154748 A1* | 7/2005 | Kraiss | 707/102 |
| 2005/0203768 A1 | 9/2005 | Florance et al. | |
| 2005/0251408 A1* | 11/2005 | Swaminathan et al. | 705/1 |
| 2007/0185867 A1 | 8/2007 | Maga et al. | 705/10 |

OTHER PUBLICATIONS

Mitchell, T.M., "Machine learning and data mining", Communications of the Association for Computing Machinery, ACM, New York, NY, vol. 42, No. 11, Nov. 1999, pp. 30-36.

Nadinic, B. et al., "New possibilities for knowledge discovery in telecommunication companies", Telecommunications, Contel 2005, Proceedings of the 8$^{th}$ International Conference on Zagreb, Croatia, Jun. 15-17, 2005, Piscataway, NJ, IEEE, Jun. 15, 2005, pp. 259-263.

Kleissner, Charly, "Data Mining for the Enterprise," IEEE Proceedings 31$^{st}$ Annual Hawaii International Conference on System Sciences, Copyright 1998, pp. 295-304.

Mitchell, Tom M., "Machine Learning and Data Mining", Communications of the Association for Computing Machinery (ACM), Nov. 1999/ vol. 42 No. 11, Copyright 1999, pp. 30-36.

Nadinic, Berislav, "New Possibilities for Knowledge Discovery in Telecommunication Companies," 8$^{TH}$ International Conference on Telecommunications — ConTel 2005, Jun. 15-17, 2005, Zagreb, Croatia, pp. 259-263.

Pedro R. Falcone Sampaio et al.: "Business Process Design and Implementation for Customer Segmentation e-Services" Proceedings of the 2005 IEEE International Conference on E-Technology, E-Commerce and E-Service, EEE-05, Hong Kong, China, Mar. 29-Apr. 1, 2005, Copyright 2005, pp. 228-234, including Table of Contents pp. v-xiv.

Richard J. Roiger et al., "A Majority Rules Approach to Data Mining," Proceedings of International Conference on Intelligent and Cooperative Information Systems, Copyright 1997, pp. 100-107.

\* cited by examiner

CHURN PREDICTION AND MANAGEMENT SYSTEM

PRIORITY CLAIM

This application claims the priority benefit of EPO Application No. 05425946.0 filed Dec. 30, 2005 and Italian Application No. MI2005A002526 filed Dec. 30, 2005, both of which are incorporated herein by reference in their entirety.

BACKGROUND

Consumers typically purchase products or subscribe to services from businesses who they perceive to be offering the best products or services at the lowest price. And while consumers are often loyal to providers and brands they are familiar with, they will surely shift allegiance if they believe they can obtain better products or services or a better price somewhere else. Established ongoing relationships with existing customers can be a significant source of revenue for many businesses losing customers to competitors can significantly cut into a company's revenue. Managing this phenomenon, taking active steps to prevent customer "churn" is a high priority for many businesses.

In many cases it is less expensive for a business to retain existing customers than to acquire new ones. For this reason many companies will go to great lengths to maintain their existing customer base. In highly competitive industries it is common for companies to implement elaborate customer loyalty programs or aggressive customer retention programs to prevent or limit churn. Such programs may offer incentives to customers to entice them to continue buying the company's products or services or they may simply provide some personalized contact or message to existing customers to reinforce and strengthen the relationship.

Designing an efficient and effective customer retention program can be difficult, especially when confronted with a large diversified customer base. Companies may not know whether churning is a significant problem or not. And if it is, which customer groups are most likely affected. Furthermore, a company's tolerance threshold for churn may be very low. Customer churn may be considered a problem even though it may only affect a small percentage of the overall customer base. Contacting all customers during a customer retention program is too expensive and inefficient. However, contacting too few customers could result in a failure to contact many customers who are likely to churn and who are the appropriate targets of the customer retention program. Deciding who to contact, represents a significant obstacle to preparing an effective customer retention program.

Ideally a customer retention program will contact the maximum number of potential churners with the fewest total number of customer contacts. This point is illustrated in the graph 10 of FIG. 1. The horizontal axis represents the percentage of the total customer population from 0-100%. The vertical axis represents the percentage of customers who will in fact churn. In this example churners comprise 5% of the overall customer base. A first curve 12 shows the results of randomly contacting all existing customers. Since churners only make up 5% of the total customer population, churners can be expected to comprise approximately 5% of any truly random sample of the customer population regardless of the size of the sample. Under these circumstance 100% of the customer population must be contacted to ensure contacting 100% of all churners. 75% of the total customer base must be contacted to reach 75% of the churners, and so forth. Because of the relatively low percentage of churners, a large number of customer contacts are wasted on customers who will not churn. In other words excessive number of non-churners must be contacted in order to the reach a meaningful number of churners. The inefficiency of this method is apparent.

A second curve 1A represents the ideal situation in which the identity of all future churners is known. In this case only churners need be contacted. No contacts be wasted on non-churners since churners comprise 5% of the total customer population, 100% of all churners can be contacted by contacting only 5% of the total customer population. Obviously, contacting only known churners is a far more efficient mechanism for reaching significant numbers of churners than by contacting customers at random. Unfortunately, the identity of customers who will churn are not known in advance, and it is not realistic to put together a customer retention target list that includes only the names of those customers who will assuredly churn in the near future.

A third curve 16 represents an attractive targeting profile for a customer retention program. While it is impossible to determine in advance which customer will churn, it is possible to determine with some degree of accuracy, which customers are more likely to churn than others. In this case, customers who are more likely to churn are targeted first. Predicting who will churn and who will not churn is not a precise science. Some customers may be contacted who have not churned and some customers who will end up churning may not be. Nonetheless, the over all affect is a significant improvement in the targeting efficiency over the randomly selected method 302. As can be seen, the shape of curve 306 approximates the shape of the ideal curve 304. Approximately 70% of all churners may be contacted by contacting only 10% of the total customer population (a significant improvement over the random contact method in which 70% of all customers would have to be contacted to reach 70% of churners). A good targeting profile will have a very steep initial rise, indicating that most of the customers initially contacted are in fact churners. The key to developing a good targeting profile is accurately predicting which customers are likely to churn and which will not. To make such predictions an intimate and detailed knowledge of the customer base is absolutely essential.

BRIEF SUMMARY

The present invention relates to a system and method for analyzing and predicting churn within a business's customer base so that steps may be taken to limit or otherwise manage churn. The system and method provide business intelligence to business users responsible for retaining customers. The business intelligence provided by the invention facilitates efforts to retain high profitability customers and prevent erosion of the customer base. The invention allows business intelligence consumers to analyze their customer base, identifying customer behavior patterns and tracking trends that impact customer churn. Such analysis can be beneficial in understanding the causes of churn and identifying early warning signs that may indicate when a customer is contemplating or has decided to drop a particular service plan. Knowing the causes of customer churn, a business may take steps to improve products and services to reduce churn in the future. Furthermore, identifying potential churners early allows a business to take proactive steps to retain customers who may otherwise be lost.

According to the invention historical data are analyzed in order to develop a strict definition of churn and to distinguish between active and churned customers. The characteristics of churners and non-churners are analyzed to identify the key characteristics of each and to identify the reasons why customers churn. Data mining processes identify clusters of customers based on a large number of variables that define various customer attributes. The clustering function allows business intelligence consumers to see patterns and associations between customers and customer groups that would otherwise remain hidden in the vast amounts of data the present invention considers. Statistical models are created to score customers based on their propensity to churn. Customers having a high propensity to churn may be contacted as part of a customer retention or churn management program and offered incentives not to drop a particular service or service plan. For example, potential churners may be offered special pricing terms, extra services, or other incentives to dissuade them from dropping a service.

The present invention analyzes the characteristics and behavior patterns of past churners and non-churners alike. The invention identifies the factors and behavior and usage patterns that often precede either a customer's decision to churn or the actual event itself after the decision has been taken. The information gleaned from past customer behavior is applied to current customer data in order to predict which present customers are likely to churn in the future. Customers with the highest propensity to churn may be selected as targets for a customer retention program. By targeting only customers having a high propensity to churn, the present invention provides optimized customer lists designed to include a much higher percentage of potential churners out of a limited portion of the overall customer base. The present invention provides the processes and tools for designing and implementing effective customer retention programs.

According to an embodiment of the invention a system for managing churn among the customers of a business having a statistically large customer base is provided. The heart of the system is an optimized data mart configured to receive and store vast amounts of customer data. A population architecture is provided to receive customer data from one or more external and load the data into the data mart. The customer data stored in the data mart define a plurality of customer attributes for the customers in the customer base. A data manipulation module is provided for preparing one or more analytical records from data stored in the data mart. The data are prepared for data mining. A data mining tool is provided for analyzing the one or more analytical records prepared by the data manipulation module. The data mining tool is adapted to return results identifying clusters of customers sharing common customer attributes and calculating individual customers' propensities to churn during a predefined period in the future. The data manipulation module returns the results and stores them in the data mart. An end user access module is provided for accessing the results returned from the data mining tool and presenting the results to a user.

Another embodiment provides a method of designing an efficient customer retention program for managing customer churn among the customers of a business having a statistically large customer base. The customer retention program includes an analysis of the causes of customer churn and identifies customers who are most likely to churn in the future. Identifying likely churners allows appropriate steps to be taken to prevent customers who are likely to churn from actually churning. The method includes adopting a set of definitions of churn sufficient to encompass all customers in the customer base and which relies on objective factors to determine whether individual customers have churned or remain active. Historical customer data are analyzed to identify significant trends and variables that provide insight into causes of churn and to identify classes of customers who are more likely to churn than others. Customer data, including data corresponding to the identified trends and variables, are prepared for data mining and predictive modeling. A Predictive model is trained on historical customer data, and the accuracy of the predictive model is verified based on historical data. Once the model is trained and its accuracy verified, the model is deployed on current customer data to generate a propensity to churn score for individual customers. The propensity to churn score indicates the relative likelihood that the individual customer will churn within a specified time period in the future. One the customers are scored the characteristics of target customers who are to be contacted during the course of the customer retention program are defined and a list of targeted customers having the defined characteristics is compiled.

In another embodiment a method of identifying targets for a customer retention program is provided. The method of this embodiment includes identifying a set of customer data variables from which a customer's propensity to churn during a future period may be estimated based on values of the identified customer data variables associated with the customer. The method further calls for providing a data mining tool with predictive modeling capabilities. The data mining tool supports at least one predictive model for estimating the propensity of individual customers to churn during the future period. The predictive model is then trained on historical customer data for which churn results are known. The at least one predictive model is then refined based on a comparison of the estimated churn propensities of individual customers against actual churn results. Once trained the predictive model is deployed on current data to estimate churn propensities of individual customers for the future period. Targets for the customer retention program are then selected based on customer churn propensities.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE PREFERRED EMBODIMENTS

Figure 2:
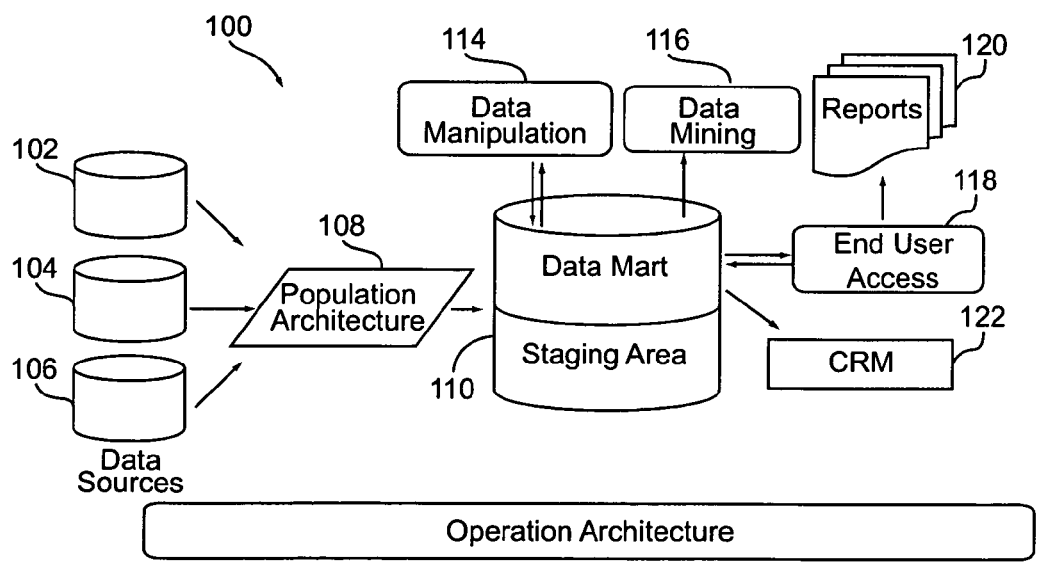
FIG. 2 is a block diagram of a churn prediction and management system according to the invention.

FIG. 2 shows a block diagram of a system 100 for analyzing and predicting churn. The system 100 includes a plurality of data sources 102, 104, 106. A dedicated data mart 110 forms the core of the system 100. A population architecture 108 is provided to perform extraction, transformation and loading functions for populating the data mart 110 with the data received from the various data sources 102, 104, 106. A data manipulation module 114 prepares data stored in the data mart 110 to be input to other applications such as a data mining module 116, and an end user access module 118, or other applications. The end user access module 118 provides an interface through which business users may interact with, view, and analyze the data collected and stored in the data mart 110. The end user access module 118 may be configured to generate a plurality of predefined reports 120 for analyzing the data. The user access module 118 includes online analytical processing (OLAP) that allows a user to manipulate and contrast data "on-the-fly" to gain further insight into customer data, historical trends, and the characteristics of active and churned customers. External systems such as CRM 122 may also consume the data stored in the data mart 110.

In order to support the churn analysis and predictive methods of the present invention, the data mart 110 must be populated with a substantial amount of customer data for each customer in the customer base. Revenue data may be provided by the enterprise billing system. Customer demographics, geographic data, and other data may be provided from a customer relationship management system (CRM). If the enterprise is a telecommunications services provider, usage patterns, traffic and interconnection data may be provided directly from network control systems. Other data sources may provide other types of customer data for enterprises engaged in other industries. Alternatively, all or some of the data necessary to populate the data mart 110 may be provided by a data warehouse system or other mass storage system.

According to an embodiment, the data requirements of the system 100 are pre-configured and organized into logical flows, so that the data source systems 102, 104, 106, etc., supply the necessary data at the proper times to the proper location. Typically this involves writing a large text file (formatted as necessary) containing all of the requisite data to a designated directory. Because most enterprises operate on a monthly billing cycle the data typically will be extracted on a monthly basis to update the data mart 110.

The population architecture 108 is an application program associated with the data mart 110. The population architecture is responsible for reading the text files deposited in the designated directories by the various data sources at the appropriate times. The population architecture may perform quality checks on the data to ensure that the necessary data are present and in the proper format. The population architecture 108 includes data loading scripts that transform the data and load the data into the appropriate tables of the data mart 110 data model.

The data mart 110 is a traditional relational database and may be based on, for example, Oracle or Microsoft SQL Server platforms. The data mart 110 is the core of the system architecture 100. The customer and revenue data are optimized for fast access and analytic reporting according to a customized data model. Star schemas allow an efficient analysis of key performance indicators by various dimensions. Flat tables containing de-normalized data are created for feeding the predictive modeling systems.

As will be described in more detail below, the data mining module 116 performs clustering functions to identify significant groupings of customers based on common characteristics or attributes. Such clusters are discovered across a large number of customer variables with no pre-conceived target variables or predefined groupings. The data mining module 116 further creates predictive models for calculating each customer's propensity to churn. The data mining module 116 may be a commercially available data mining tool such as the SAS data miner or the KXEN data mining tool. In order to maximize the discovery power of the data mining tool, variables known to be significant to identifying and predicting churn are provided to the data mining module 116. The data manipulation module 114 pulls the necessary data from the data mart 110, calculates derived variables and formats others to create data files for feeding data into the data mining module 116. The effectiveness of the data mining operation is highly dependent on the quality of the data provided to the data mining tool. Accordingly, as will be described in more detail below, great care must be taken in the selection of the variables supplied to the data mining tool. The data manipulation module 114 is also responsible for receiving the output from the data mining module and loading the results back into the data mart 110.

The end-user access module 118 pulls data from the data mart 110 to be displayed in the various pre-configured reports 120. The end user access module 118 includes online analytical processing capabilities based on market standard reporting software. Because all of the data stored in the data mart 110 are accumulated and stored on a customer by customer basis, the online analytical processing capabilities of the end user access module 118 allow the end user to alter display criteria and filter customers by various customer attributes such as relevant clusters, churn propensity, and the like, to significantly expand the business intelligence insights that may be gleaned from the churn analysis and predictive modeling system.

Figure 3:
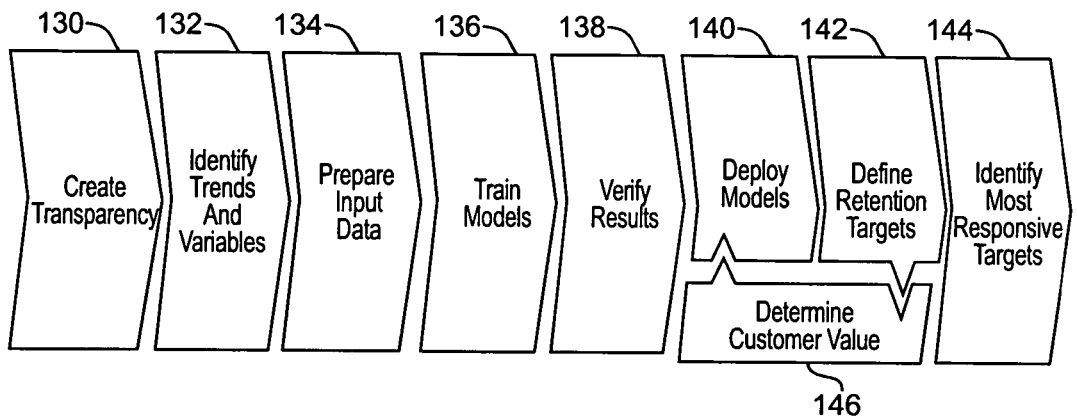
FIG. 3 is a flow chart of a method of predicting and managing churn according to the invention.

FIG. 3 is a flow chart outlining the tasks for implementing a churn prediction and management program according to the invention. A first preliminary task 130 is to create transparency among the customers in the customer base. It is expected that the present invention will be implemented within a large and diverse customer base. For example, an embodiment of the invention may be implemented to predict and manage churn within a telecommunications service provider's customer base. A telecommunications service provider (telecom) may have millions of customers. Customers may have different service plans, different billing arrangements (prepaid/post paid, etc.), or other service options. Creating transparency involves providing a set of flexible but rigorous definitions of churn that may be applied to all customers within the telecom's customer base. A satisfactory definition of churn is one that may be translated into technical constraints which, when applied to customer data, leaves no doubt as to which customers are active, which customers have churned and, in the case of customers who have churned, the timing of the transition from being an active customer to becoming a churned customer (churn date). The definition of churn may differ from business to business, and along different product or service lines. Whatever the definition of churn that is finally adopted will be highly dependent on the services offered by the business and other operational considerations. Provisions must be made for distinguishing between internal and external churn, voluntary and involuntary churn, and the like.

Figure 4:
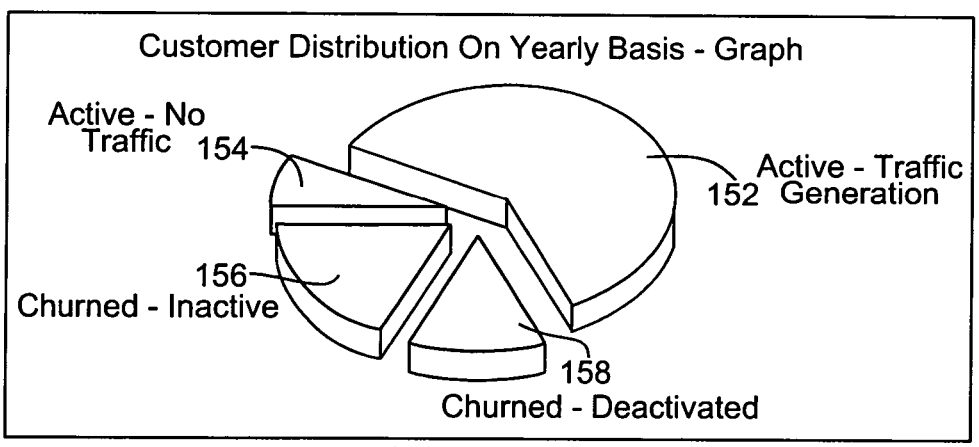
FIG. 4 is a graphical report analyzing the distribution of customers in a customer population based on active or churned status.

Once churn has been adequately defined, historical customer data can be analyzed to gain insights into the factors and circumstances that lead to instances of churn. For example, once churn has been defined it is a fairly straightforward process to classify current and past customers as either active or churned. Analysis of these two groups, their usage patterns, profitability, the average tenure of customers within each group, and many other trends and variables can provide significant insights into the causes of churn and clues to identifying the customers likely to churn in the future. For example, FIG. 4 shows a report 150 that may be generated directly from the customer data stored in the data mart 110 once an adequate definition of churn has been established. Once again, the data illustrated here relate to an embodiment for predicting and managing churn for a telecommunications service provider. In the report 150 customers are divided among active customers who have generated traffic 152 (60.95%), active customers with no traffic 154 (7.58%), churned-inactive customers 156 (18.29%), and churned deactivated customers 158 (13.18). The report 150 provides a quick, easy way to absorb analysis of the present state of the customer base. Thus, even at this early stage of the churn prediction and management process, useful information has been gathered and presented. Personnel responsible for managing churn can use the report 150 to gauge how big a problem churn may or may not be.

Figure 5:
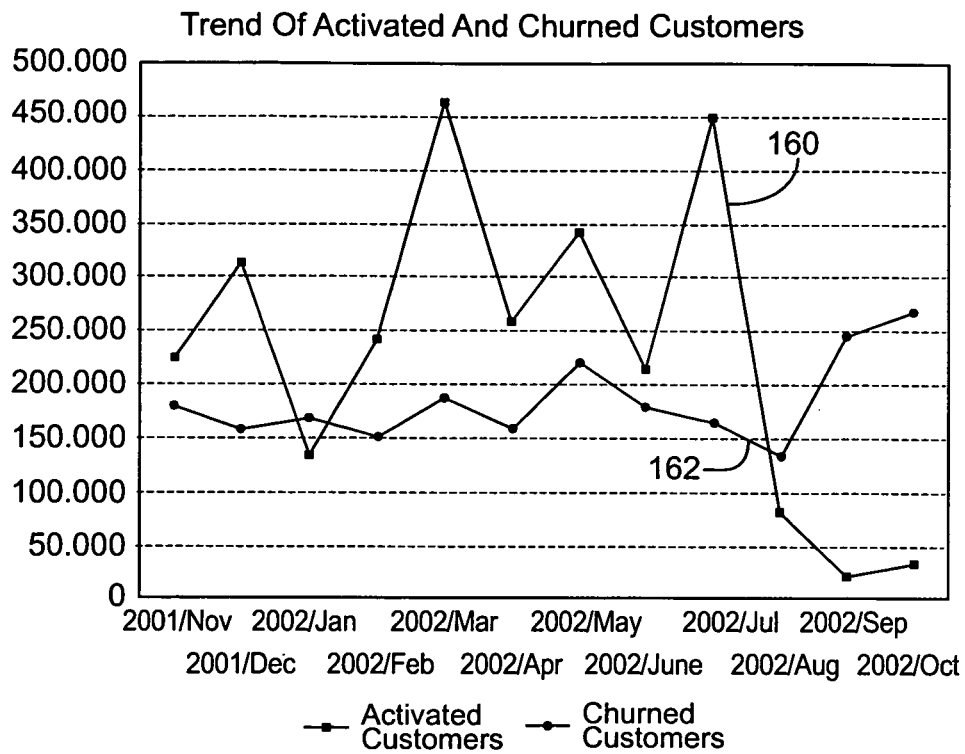
FIG. 5 is a graphical report analyzing monthly trends of activated and churned customers.

FIG. 5 is a report showing the monthly trend of activated customers 160 versus churned customers 162. This report indicates that the period between September and August was the most critical, because this period had the biggest gap between the number of customers activated and the number of customers who churned.

Figure 1:
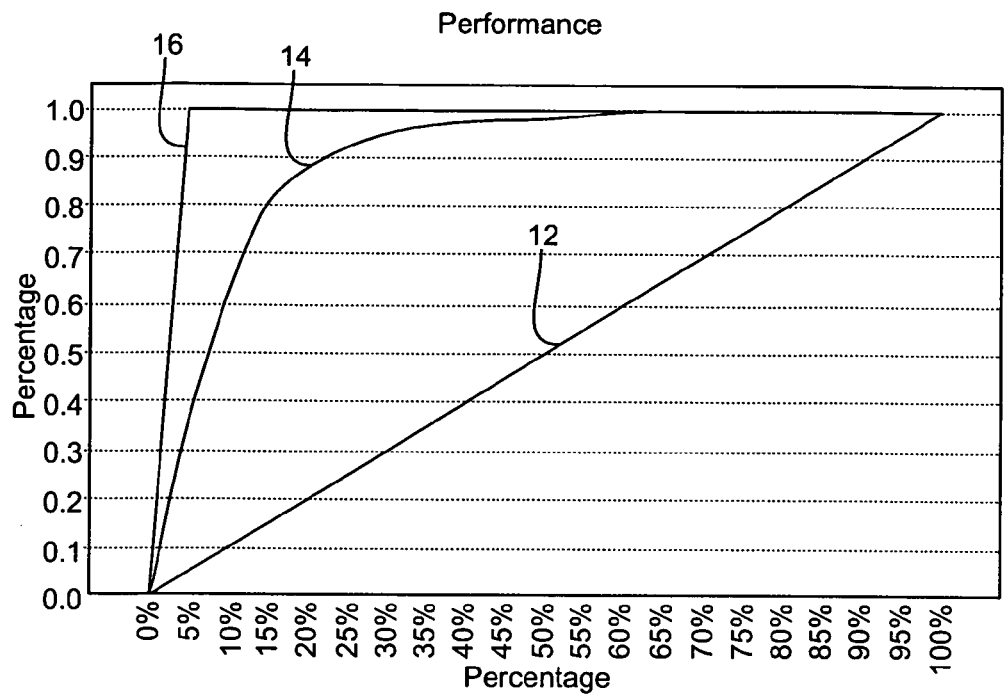
FIG. 1 is a graph showing the percentage of future churners contacted during a customer retention program versus the overall percentage of customers contacted.

Another preliminary task in the churn prediction and management process involves identifying significant trends and variables that impact churn 132. The purpose of identifying trends and variables at 132 is to identify the most significant customer variables which when aggregated, averaged, compared or otherwise dissected, manipulated, and evaluated may provide insights into customer churn and the individual decisions made by customers that lead to churn. The trends and variables identified at this stage will be highly dependent on the specific products and services a company or service provider provides. For example, according to an embodiment of the invention, approximately 200 variables and trends have been identified for analyzing historical data for predicting and managing churn among the customers of a telecommunications service provider. A complete list of these variables and a brief description of each is shown in Table 1. Some of the variables may be obtained directly from the data provided by the operational data sources, 102, 104, 106 (FIG. 1). Many others must be derived from the raw data.

TABLE 1

| Variable | Type | Measurement | Definition |
| --- | --- | --- | --- |
| CUSTOMER_ID | id | nominal | Customer Identification Key |
| IS_CHURN | target | binary | Flag variable as target for churn prediction; IS_CHURN = 1 if END_DATE minus LAST_CALL_DATE greater then 2 month, else IS_CHRUN = 0 |
| BEHAVIOUR_CLUSTER_ID | input | nominal | Cluster Identification of behavior clustering |
| CITY | input | nominal | City |
| GENDER | input | nominal | Gender |
| LANGUAGE | input | nominal | Language |
| MARITAL_STATUS | input | nominal | Marital status |
| NATIONALITY | input | nominal | Nationality |
| PROVINCE | input | nominal | Province |
| REGION | input | nominal | Region |
| ZIP_CODE | input | nominal | Zip code |
| XYZ_1_2_24 | input | interval | Number of deactivated Products of the product group XYZ per months |
| ACCESS_INTERNET_1_24_SUM | input | interval | Number of active Products of the product group ACCESS_INTERNET for last 6 months |
| ACCESS_INTERNET_1_2_24 | input | interval | Number of deactivated Products of the product group ACCESS_INTERNET per months |
| ACCESS_INTERNET_1_2_25 | input | interval | Number of active Products of the product group ACCESS_INTERNET per months |
| ACCESS_INTERNET_1_3_24 | input | interval | Number of deactivated Products of the product group ACCESS_INTERNET per months |
| ACCESS_INTERNET_1_4_24 | input | interval | Number of deactivated Products of the product group ACCESS_INTERNET per months |
| ACCESS_INTERNET_1_5_24 | input | interval | Number of active Products of the product group ACCESS_INTERNET per months |
| ACCESS_INTERNET_1_6_24 | input | interval | Number of deactivated Products of the product group ACCESS_INTERNET per months |
| ACCESS_INTERNET_1_7_24 | input | interval | Number of deactivated Products of the product group ACCESS_INTERNET per months |
| ACCESS_VOICE_1_24_SUM | input | interval | Number of deactivated Products of the product group ACCESS_VOICE for 6 months |
| ACCESS_VOICE_1_2_24 | input | interval | Number of deactivated Products of the product group ACCESS_VOICE per months |
| ACCESS_VOICE_1_2_25 | input | interval | Number of active Products of the product group ACCESS_VOICE per months |
| ACCESS_VOICE_1_3_24 | input | interval | Number of deactivated Products of the product group ACCESS_VOICE per months |

TABLE 1-continued

| Variable | Type | Measurement | Definition |
| --- | --- | --- | --- |
| ACCESS_VOICE_1_4_24 | input | interval | Number of deactivated Products of the product group ACCESS_VOICE per months |
| ACCESS_VOICE_1_5_24 | input | interval | Number of deactivated Products of the product group ACCESS_VOICE per months |
| ACCESS_VOICE_1_6_24 | input | interval | Number of deactivated Products of the product group ACCESS_VOICE per months |
| ACCESS_VOICE_1_7_24 | input | interval | Number of deactivated Products of the product group ACCESS_VOICE per months |
| ACCESS_VOICE_DIVERSE_1_2_25 | input | nominal | Number of active Products of the product group ACCESS_VOICE_DIVERSE per months |
| KYT_1_2_24 | input | nominal | Number of deactivated Products of the product group KYT per months |
| BUNDLE_ACCESS_VOICE_1_2_25 | input | nominal | Number of active Products of the product group BUNDLE_ACCESS_VOICE per months |
| EBILL_1_2_25 | input | nominal | Number of active Products of the product group EBILL per months |
| YTR_1_2_24 | input | nominal | Number of deactivated Products of the product group YTR per months |
| IDENTIFIKATION_1_2_24 | input | nominal | Number of deactivated Products of the product group IDENTIFIKATION per months |
| REBATE_VOICE_1_2_25 | input | interval | Number of active Products of the product group REBATE_VOICE per months |
| SERVICES_1_2_25 | input | nominal | Number of active Products of the product group SERVICES per months |
| SERVICE_SUPPORT_1_2_24 | input | nominal | Number of deactivated Products of the product group SERVICE_SUPPORT per months |
| SPECIAL_OPTIONS_1_2_24 | input | nominal | Number of deactivated Products of the product group SPECIAL_OPTIONS per months |
| STANDARDISIERTE_OPTI_1_2_24 | input | nominal | Number of deactivated Products of the product group STANDARDISIERTE_OPTI per months |
| LAG1_REV | input | interval | Revenue of month 2 minus revenue in month 3 |
| LAG2_REV | input | interval | Revenue of month 3 minus revenue in month 4 |
| LAG3_REV | input | interval | Revenue of month 4 minus revenue in month 5 |
| LAG4_REV | input | interval | Revenue of month 5 minus revenue in month 6 |
| LAG5_REV | input | interval | Revenue of month 6 minus revenue in month 7 |
| LAG1_USAGE | input | interval | Cost of voice, surf and sms usage month 2 minus month 3 |
| LAG2_USAGE | input | interval | Cost of voice, surf and sms usage month 3 minus month 4 |
| LAG1_VOICE | input | interval | Cost of voice event type month 3 minus month 3 |
| LAG2_VOICE | input | interval | Cost of voice event type month 3 minus month 4 |
| MEAN_PERC_U | input | interval | Percentage of mean usage on mean revenue for month 2, 3, 4 |
| MEAN_R | input | interval | Average revenue between months 2 and 7 |
| MEAN_U | input | interval | Average cost for usage (surf, voice, sms) between months 2 and 4 |
| MEAN1_R | input | interval | Average revenue between months 2 and 4 |
| USAGE_2 | input | interval | Cost of usage (sms, voice, surf) for month 2 |
| USAGE_3 | input | interval | Cost of usage (sms, voice, surf) for month 3 |
| USAGE_4 | input | interval | Cost of usage (sms, voice, surf) for month 4 |
| REVENUE_2 | input | interval | Amount of revenue per month (revenue - discount) |
| REVENUE_3 | input | interval | Amount of revenue per month (revenue - discount) |
| REVENUE_4 | input | interval | Amount of revenue per month (revenue - discount) |
| REVENUE_5 | input | interval | Amount of revenue per month (revenue - discount) |
| REVENUE_6 | input | interval | Amount of revenue per month (revenue - discount) |
| REVENUE_7 | input | interval | Amount of revenue per month (revenue - discount) |
| N_AMOUNT_2_22 | input | interval | Amount of revenue without discount per month |
| N_AMOUNT_3_22 | input | interval | Amount of revenue without discount per month |
| N_AMOUNT_4_22 | input | interval | Amount of revenue without discount per month |
| N_AMOUNT_5_22 | input | interval | Amount of revenue without discount per month |
| N_AMOUNT_6_22 | input | interval | Amount of revenue without discount per month |
| N_AMOUNT_7_22 | input | interval | Amount of revenue without discount per month |
| Y_AMOUNT_2_22 | input | interval | Amount of applied discount per month |
| Y_AMOUNT_3_22 | input | interval | Amount of applied discount per month |
| Y_AMOUNT_4_22 | input | interval | Amount of applied discount per month |
| Y_AMOUNT_5_22 | input | interval | Amount of applied discount per month |
| Y_AMOUNT_6_22 | input | interval | Amount of applied discount per month |
| Y_AMOUNT_7_22 | input | interval | Amount of applied discount per month |
| PERC_USAGE_2 | input | interval | percentage of surf, voice and sms usage for month 2 |
| PERC_USAGE_3 | input | interval | percentage of surf, voice and sms usage for month 3 |
| PERC_USAGE_4 | input | interval | percentage of surf, voice and sms usage for month 4 |
| PERC_VOICE_2 | input | interval | percentage of voice destination for month 2 |
| PERC_VOICE_3 | input | interval | percentage of voice destination for month 3 |
| PERC_VOICE_4 | input | interval | percentage of voice destination for month 4 |
| SMS_COST_2_5 | input | interval | Cost of usage for SMS Event type per months |
| SMS_COST_3_5 | input | interval | Cost of usage for SMS Event type per months |
| SMS_COST_4_5 | input | interval | Cost of usage for SMS Event type per months |
| SMS_COST_5_5 | input | interval | Cost of usage for SMS Event type per months |

TABLE 1-continued

| Variable | Type | Measurement | Definition |
|---|---|---|---|
| SMS_COST_6_5 | input | interval | Cost of usage for SMS Event type per months |
| SMS_COST_7_5 | input | interval | Cost of usage for SMS Event type per months |
| SURF_COST_2_5 | input | interval | Cost of usage for SURF Event type per months |
| SURF_COST_3_5 | input | interval | Cost of usage for SURF Event type per months |
| SURF_COST_4_5 | input | interval | Cost of usage for SURF Event type per months |
| SURF_COST_5_5 | input | interval | Cost of usage for SURF Event type per months |
| SURF_COST_6_5 | input | interval | Cost of usage for SURF Event type per months |
| SURF_COST_7_5 | input | interval | Cost of usage for SURF Event type per months |
| VOICE_COST_2_5 | input | interval | Cost of usage for VOICE Event type per months |
| VOICE_COST_3_5 | input | interval | Cost of usage for VOICE Event type per months |
| VOICE_COST_4_5 | input | interval | Cost of usage for VOICE Event type per months |
| VOICE_COST_5_5 | input | interval | Cost of usage for VOICE Event type per months |
| VOICE_COST_6_5 | input | interval | Cost of usage for VOICE Event type per months |
| VOICE_COST_7_5 | input | interval | Cost of usage for VOICE Event type per months |
| WINBACK_1_23_SUM | input | nominal | Number of winback campaigns a customers was contacted |
| WINBACK_1_2_23 | input | nominal | Flag variable for each contacted customer in winback campaign month 2 |
| WINBACK_1_3_23 | input | nominal | Flag variable for each contacted customer in winback campaign month 3 |
| WINBACK_1_4_23 | input | nominal | Flag variable for each contacted customer in winback campaign month 4 |
| WINBACK_1_5_23 | input | nominal | Flag variable for each contacted customer in winback campaign month 5 |
| WINBACK_1_6_23 | input | nominal | Flag variable for each contacted customer in winback campaign month 6 |
| WINBACK_1_7_23 | input | nominal | Flag variable for each contacted customer in winback campaign month 7 |

In many cases the raw historical data must be aggregated in some manner in order to present the data in a coherent meaningful way. A particularly useful way of aggregating the customer data is to calculate customer distributions relative to different variables and to classify customers according to where they fall within the distribution. Here an example is instructive. Most businesses would likely be interested in understanding the relationship between churn and the average monthly revenue generated by individual customers. What is the churn rate for low revenue customers compared to high revenue customers? Is there a revenue class that has a higher churn rate than other revenue classes? These questions and questions like them may be answered by calculating the average monthly revenue for each customer in the customer base, calculating the distribution of customers based on their average revenue, and classifying customers based on their position within the overall distribution. Thresholds may be established, and customers may be classified according to their positions within the customer distribution relative to the thresholds. For example customers may be classified as having very low average monthly revenue, low, medium, high, very high and highest average monthly revenue. Of course, different classifications appropriate to other variables may be devised as well. Finally, the churn rate, or some other performance measure may be calculated for each class as a whole and the results plotted in graphical form. Other methods of aggregating, manipulating and displaying significant trends and variable data may also be adopted.

Figure 6:
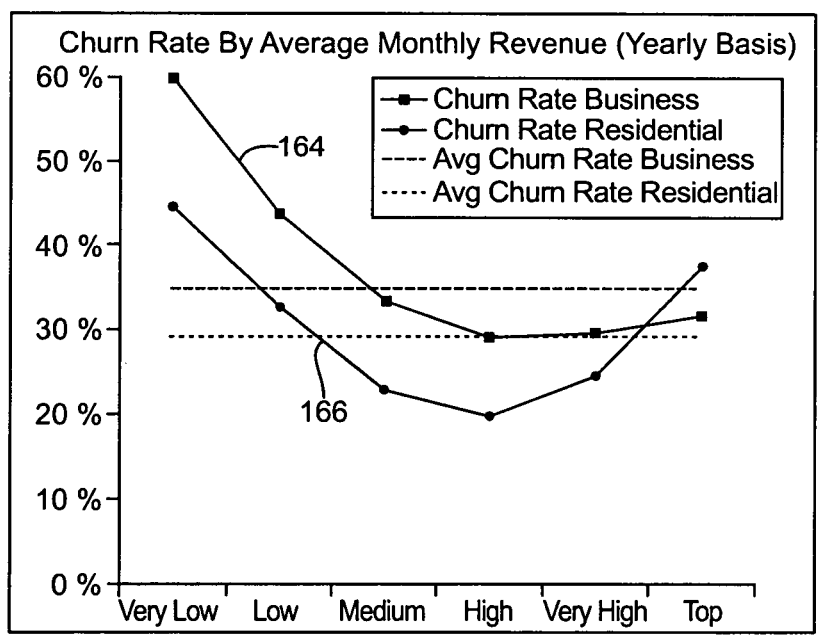
FIG. 6 is a graphical report showing the churn rate for various monthly revenue classes.
Figure 7:
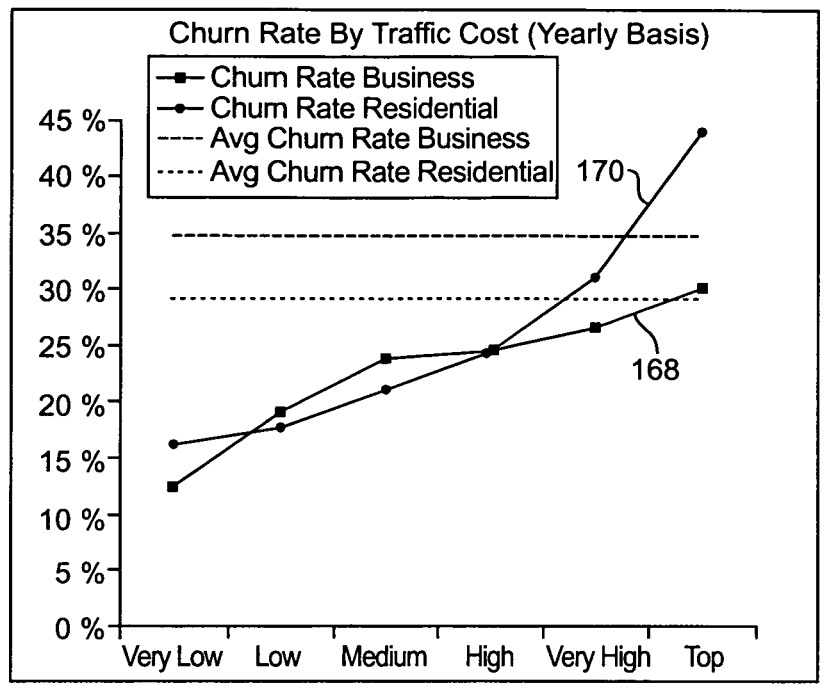
FIG. 7 is a graphical report showing the churn rate for various traffic cost classes.
Figure 8:
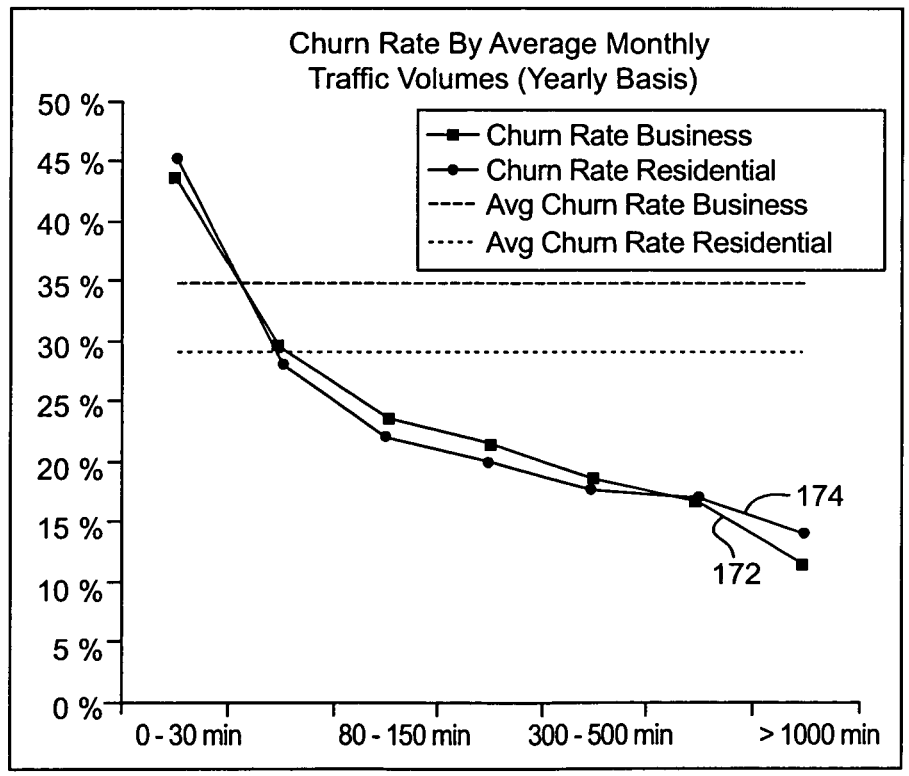
FIG. 8 is a graphical report showing the churn rate for various monthly traffic volume classes.

FIGS. 6-8 are graphical reports of the churn rate plotted against customer distributions relative to average monthly revenue, traffic costs, and average monthly traffic, respectively. Each of the customer distributions are calculated as described above. The data are further broken out between residential and business customers. The data represent the average revenue, traffic volume and traffic costs associated with customer use of telecommunication services. The reports shown in FIGS. 6-8 are among the many preconfigured reports 120 that may be provided by the end user access module 118. Additional preconfigured reports 120 may be created based on other significant variables identified at task 132. The reports shown in FIGS. 6-8 provide a sampling of the insights into the causes of churn and of the types of customers likely to churn in the future that may be gained by performing an historical analysis of customer behavior based on significant trends and variables identified in task 134.

FIG. 6 shows the churn rate by average monthly revenue class for both business customers 164 and residential customers 166. Both curves show a pronounced peak among very low revenue generators, and a second, though less pronounced, peak among high revenue customers. The two peaks indicate areas where churn may be a problem.

FIG. 7 is a report that shows the churn rate by traffic cost. Again the data are presented separately for both business customers 168 and residential customers 170. Not surprisingly, the churn rate is highest among customers having the highest traffic costs.

Next, FIG. 8 shows the churn rate by average monthly traffic volumes for both business 172 and residential 174 customers. Both curves exhibit a peak among customers whose traffic volume averages between 0 and 30 minutes per month. This also is not surprising, since it coincides well with the report of FIG. 6 which showed that customers who generated the least revenue had the highest churn rate. Customers who average the least amounts of monthly traffic are likely among the lowest revenue generators, thus it is intuitive that both classes of customers would exhibit similar churn rates, since both classes will likely contain many of the same customers. Customers who had the highest traffic volume in FIG. 8 had the lowest churn rate. Similarly customers having the lowest traffic costs from FIG. 7 also had the lowest churn rate. These two groups also likely contain many of the same customers, since lower traffic costs will likely entice customers to generate more traffic. High traffic at low cost likely generates moderate monthly revenue figures. Not surprisingly, customers generating medium to high revenue have the lowest churn rate as seen in FIG. 6.

As these examples make clear, analyzing historical data according to the significant trends and variables identified in task 132 can provide significant insights into customer behavior and the causes of churn. It can also help identify the characteristics of customers who have churned in the past, characteristics which may help identify customers who may churn in the future. The analysis described above is but a small sampling of the types of analysis that are possible using the present invention. Preconfigured reports 120 may be derived containing substantially any of the variables identified at 132. For an embodiment relating to predicting and managing churn within a telecommunications service provider's customer base, reports may be created to compare and contrast the churn rate and/or any of the approximately 200 significant variables that have been identified. The ready access to such reports creates an unparalleled opportunity to delve into the nature and causes of churn.

Moving beyond the historical analysis of past churn events, the present invention further provides data mining and statistical modeling functions for identifying additional characteristics of churners and common patterns that lead to churn. The two main data mining functions are a clustering analysis function and predictive modeling. The clustering function analyzes large numbers of customer attributes and identifies significant customer groupings based on shared attributes. The cluster analysis function is somewhat analogous to the historical data analysis described above, however, whereas the historical analysis described above is limited to two dimensions, e.g. churn rate v. average monthly revenue class, the cluster analysis examines data and identifies clusters across substantially unlimited dimensions. Because the data mining module is capable of considering, comparing, and cross referencing a vast number of different customer attributes and variables, the data mining module is able to identify significant groups of customers whose similarities may have otherwise remained submerged in a sea of seemingly unrelated data points amassed in the data mart 110. The data mining tool is also provided to generate predictive models for determining which customers are likely to churn in the future. The predictive models are provided to score individual customers based on their propensity to churn in the future.

An important factor in successful data mining is the quality of the data supplied to the data mining tool. By adroit selection and manipulation of the raw customer data received from external operating systems 102, 104, 106 the system and method of the present invention can leverage knowledge and experience of the business and industry in which churn is to be predicted and managed. Accordingly, the process for predicting and managing churn shown in FIG. 3 includes the task of preparing the input data 134. Preparing the data may include retrieving and formatting data, calculating derived variables, evaluating trends, calculating averages, slopes of trend lines or other curves, and other application specific functions. For example, in the embodiment of the invention adapted for predicting and managing churn in a telecommunications service provider's customer base, various data sets have been developed to maximize the discovery power of the data mining tool. The data selected for inclusion in the data sets are the result of detailed knowledge and a thorough understanding of the telecommunications industry.

In addition to raw customer data received from external systems, variables derived from the raw data can provide significant insights into the causes of churn and the characteristics of customers likely to churn. As with the analysis on historical data, derived variables can play a substantial role in identifying clusters of customers based on similar attributes and evaluating the churn rate for such clusters to determine whether the characteristics that define the clusters are relevant predictors of churn.

The derived variables for feeding the clustering function of the data mining tool may be calculated in much the same way as the derived variables for the analysis on historical data. In fact many of the derived variables from the analysis on historical data may be applied to current data and provided to the clustering function. The derived variables may be based on any variables that have a continuous smooth domain. In other words, variables that can take on only a small number of discrete values such as male/female, student/adult/senior, and the like, are not appropriate for input to the clustering function. Acceptable variables may include averages, such as average customer revenue over a predefined time period, the slope of customers' profitability trend lines, average traffic patterns, usage trends, and the like. The customer distribution is then calculated based on the value of the selected variable for each individual customer. Customers may then be classified according to their position in the distribution and their classification stored as a derived variable.

In the context of the system 100 shown in FIG. 1, the data manipulation module 114 pulls data from the data mart 110 and calculates the derived variables when necessary to create customer analytical records (CARs) which drive the customer data to the data mining tool 116. The CARs embody the data sets devised to maximize the discovery power of the data mining tool 116. Different CARs may be created depending on the data mining function to be performed. Alternatively, the same CAR may be created for providing data to multiple data mining functions but different variables may be selected from the CAR to be input to the data mining tool depending on the data mining function to be performed. Examples of CARs are shown in Tables 2, 3 and 4. Table 2 shows a CAR for providing data to the data mining tool for performing the clustering function relative to customer behavior type variables. Table 3 shows a CAR for providing data to the data mining tool for performing the clustering function relative to customer value type variables. Table 4 shows a CAR for providing data to the data mining tool for performing predictive modeling. Within each CAR the rows represent individual customer records and the columns represent data variables included in the CAR.

TABLE 2

| Attribute Name | Attribute Description | Type | Is Req | Notes/Issues |
| --- | --- | --- | --- | --- |
| CUSTOMER ID | Unique Identifier | String | Yes | |
| CUSTOMER NAME | (Last Name & ' ' & First Name) or Corporate Name | String | Yes | |
| SEGMENT | Customer segmentation provided by the Legacy Systems (Corporate/Consumer . . . ) | String | | |

TABLE 2-continued

| Attribute Name | Attribute Description | Type | Is Req | Notes/Issues |
|---|---|---|---|---|
| INDIVIDUAL FLAG | Y/N. Y for Individual Customers. N for Corporate Customers | Boolean | | |
| GENDER | Only for Individual Customers: M (Male)/F(Female) | String | | |
| MARITAL_STATUS | Only for Individual Customers: Customer* Marital Status (Married, Divorced, Single . . . ) | String | | |
| OCCUPATION_TYPE | Only for Individual Customers: Customer* type of work | String | | |
| NATIONALITY | Customer Nationality | String | | |
| LANGUAGE | Mother Tongue of the Customer | String | | |
| INDUSTRY | Only for Corporate Customers: industry or trade type of the Company | String | | |
| ADDRESS | Home/Headquarters address of the Indivdual/Corporate Customer | String | | |
| ZIP_CODE | Geography Identifier. Zip Code of the home/headquarters address of the Individual/Corporate Customer | String | | |
| PROVINCE | Province of the home/headquarters address of the Individual/Corporate Customer | String | | |
| REGION | Region of the home/headquarters address of the Individual/Corporate Customer | String | | |
| COUNTRY | Country of the home/headquarters address of the Individual/Corporate Customer | String | | |
| STATUS | Account Status as defined in the legacy system (e.g.: "Suspect", "Prospect", "Active") | String | | |
| PRE_PAID_FLAG | Y/N. Y for Prepaid Customers. N for Postpaid Customers | Boolean | | |
| LINES_NUM | Number of active MSISDN/CLI belonging to the Customer | Number | | |
| IS FRAUDER | Indicates if the customer is considered a frauder. Field permitted values: 0 if he is not a frauder; 1 if he is a frauder. Default value 0 | Bolean | | |
| CALL DETAIL FLAG | Y/N (N default value, Y for Customer receiving invoices with Call Detail) | Boolean | | |
| TYPE OF SELLER | Seller Type in charge of promotion/marketing activities for the customer | String | | |
| ACQUISITION DATE | Purchase Date of the first product for the customer | Date | | |
| ACTIVATION DATE | For customers with at least one service activated -> First Service Activation Date | Date | | |
| DEACTIVATION DATE | Only for customers with all services deactivated -> Last Service Deactivation Date | Date | | |
| LAST EVENT DATE | Last Event Date (Call, SMS, etc . . . ) | Date | | |
| LAST CALL DATE | Last Call Date | Date | | |
| LAST SMS DATE | Last SMS Date | Date | | |

TABLE 2-continued

| Attribute Name | Attribute Description | Type | Is Req | Notes/Issues |
|---|---|---|---|---|
| LAST MMS DATE | Last MMS Date | Date | | |
| LAST EVENT TYPE 1 DATE | Last event Type 1 Date | Date | | |
| LAST CONTACT DATE | Last Date of Customer Contacts | Date | | |
| LAST BILL DATE | Last bill date | Date | | |
| LAST HANDSET MODEL | Type of the last handset | String | | |
| IS CHURN | Customer Status Flag. 0 if the customer is Active, 1 if the Customer is Churned | Boolean | Yes | |
| CHURN DATE | Date of the Churn Event | Date | | |
| CUSTOMER STATUS | Customer Status Description as defined in the Churn Data Mart (e.g. "Active", "Churned") | String | | |
| CUSTOMER STATUS 02 | Customer Sub-Status Description | String | | |
| CUSTOMER STATUS 03 | Customer Sub-Status Description | String | | |
| TENURE | Contract Age (number of months from the activation date) | Number | | |
| TENURE CODE | Contarct Age Code | Number | Yes | |
| AVG CALL VOLUME | Average Monthly Duration of Calls | Number | | |
| CALL VOLUME CODE | Unique Identifier of the Call Volume Class | Number | Yes | |
| AVG CALL COST | Average Monthly Cost of Calls | Number | | |
| CALL COST CODE | Unique Identifier of the Call Cost Class | Number | Yes | |
| AVG SMS VOLUME | Average Monthly Number of SMS | Number | | |
| SMS VOLUME CODE | Unique Identifier of the SMS Volume Class | Number | Yes | |
| AVG SMS COST | Average Monthly Cost of SMS | Number | | |
| SMS COST CODE | Unique Identifier of the SMS Cost Class | Number | Yes | |
| AVG MMS VOLUME | Average Monthly Number of MMS | Number | | |
| MMS VOLUME CODE | Unique Identifier of the MMS Volume Class | Number | Yes | |
| AVG MMS COST | Average Monthly Cost of MMS | Number | | |
| MMS COST CODE | Unique Identifier of the MMS Cost Class | Number | Yes | |
| AVG ET1 VOLUME | Average Monthly Volume of Event Type 1 | Number | | |
| ET1 VOLUME CODE | Unique Identifier of the Event Type 1 Volume Class | Number | Yes | |
| AVG ET1 COST | Average Monthly Cost of Event Type 1 | Number | | |
| ET1 COST CODE | Unique Identifier of the Event Type 1 Cost Class | Number | Yes | |
| REVENUE | Last n months Revenue Amount | Number | | |
| DISCOUNT | Last n months Discount Amount | Number | | |
| AVG REVENUE | Average Monthly Revenue | Number | | |
| REVENUE CODE | Unique Identifier of the Reveue Class | Number | Yes | |
| AVG EVENT VOLUME | Average Monthly Events Units | Number | | |
| EVENT VOLUME CODE | Unique Identifier of the Event Volume Class | Number | Yes | |
| AVG INV X EVE | Average Revenue per Average Monthly Units (average monthly revenue/average monthly units) | Number | | |

TABLE 2-continued

| Attribute Name | Attribute Description | Type | Is Req | Notes/Issues |
|---|---|---|---|---|
| INV X EVE CODE | Unique Identifier of the Invoice per Event Class | Number | Yes | |
| AVG PROFIT | Average Monthly Profit | Number | | |
| PROFIT CODE | Unique Identifier of the Profit Class | Number | Yes | |
| PAY_CREDIT_CARD | The number of Accounts having a Credit Card Payment Method related to the Customer | Number | | |
| PAY_DIRECT_DEBIT | The number of Accounts having a Direct Debit Payment Method related to the Customer | Number | | |
| PAY_CREDIT_TRANSFER | The number of Accounts having a Credit Trans. Payment Method related to the Customer | Number | | |
| PS_01 | The number of Products PS_01 subscribed by the Customer | Number | | |
| ... | | Number | | |
| PS_nn | The number of Products PS_nn subscribed by the Customer | Number | | |
| PL_01 | The number of Price List PL_01 subscribed by the Customer | Number | | |
| ... | | Number | | |
| PL_nn | The number of Price List PL_nn subscribed by the Customer | Number | | |
| FLAT_VOL_1 | The flat band usage units the month before the analysis | Number | | |
| ... | | Number | | |
| FLAT_VOL_n | The flat band usage units the n months before the analysis | Number | | |
| ON_PEAK_VOL_1 | The onpeak band usage units the month before the analysis | Number | | |
| ... | | Number | | |
| ON_PEAK_VOL_n | The onpeak band usage units the n months before the analysis | Number | | |
| OFF_PEAK_VOL_1 | The offpeak band usage units the month before the analysis | Number | | |
| ... | | Number | | |
| OFF_PEAK_VOL_n | The offpeak band usage units n months before the analysis | Number | | |
| FLAT_VOL_W1 | The flat band usage units the week before the analysis | Number | | |
| ... | | Number | | |
| FLAT_VOL_Wn | The flat band usage units the n weeks before the analysis | Number | | |
| ON_PEAK_VOL_W1 | The onpeak band usage units the week before the analysis | Number | | |
| ... | | Number | | |
| ON_PEAK_VOL_Wn | The onpeak band usage units the n weeks before the analysis | Number | | |
| OFF_PEAK_VOL_W1 | The offpeak band usage units the week before the analysis | Number | | |
| ... | | Number | | |
| OFF_PEAK_VOL_Wn | The offpeak band usage units n weeks before the analysis | Number | | |
| VOICE_NUM_1 | The total number of call the month before the analysis | Number | | |
| ... | | Number | | |

TABLE 2-continued

| Attribute Name | Attribute Description | Type | Is Req | Notes/Issues |
|---|---|---|---|---|
| VOICE_NUM_n | The total number of call n months before the analysis | Number | | |
| VOICE_COST_1 | The total cost of call the month before the analysis | Number | | |
| . . . | | Number | | |
| VOICE_COST_n | The total cost of call n months before the analysis | Number | | |
| VOICE_VOL_1 | The total usage minutes the month before the analysis | Number | | |
| . . . | | Number | | |
| VOICE_VOL_n | The total usage minutes the n months before the analysis | Number | | |
| VOICE_NUM_W1 | The total number of call the week before the analysis | Number | | |
| . . . | | Number | | |
| VOICE_NUM_Wn | The total number of call n weeks before the analysis | Number | | |
| VOICE_COST_W1 | The total cost of call the week before the analysis | Number | | |
| . . . | | Number | | |
| VOICE_COST_Wn | The total cost of call n weeks before the analysis | Number | | |
| VOICE_VOL_W1 | The total usage minutes the week before the analysis | Number | | |
| . . . | | Number | | |
| VOICE_VOL_Wn | The total usage minutes the n weeks before the analysis | Number | | |
| SMS_NUM_1 | The total number of SMS the month before the analysis | Number | | |
| . . . | | Number | | |
| SMS_NUM_n | The total number of SMS n months before the analysis | Number | | |
| SMS_COST_1 | The total cost of SMS the month before the analysis | Number | | |
| . . . | | Number | | |
| SMS_COST_n | The total cost of SMS n months before the analysis | Number | | |
| SMS_NUM_W1 | The total number of SMS the week before the analysis | Number | | |
| . . . | | Number | | |
| SMS_NUM_Wn | The total number of SMS n weeks before the analysis | Number | | |
| SMS_COST_W1 | The total cost of SMS the week before the analysis | Number | | |
| . . . | | Number | | |
| SMS_COST_Wn | The total cost of SMS n weeks before the analysis | Number | | |
| MMS_NUM_1 | The total number of MMS the month before the analysis | Number | | |
| . . . | | Number | | |
| MMS_NUM_n | The total number of MMS n months before the analysis | Number | | |
| MMS_COST_1 | The total cost of MMS the month before the analysis | Number | | |
| . . . | | Number | | |
| MMS_COST_n | The total cost of MMS n months before the analysis | Number | | |
| MMS_NUM_W1 | The total number of MMS the week before the analysis | Number | | |
| . . . | | Number | | |
| MMS_NUM_Wn | The total number of MMS n weeks before the analysis | Number | | |
| MMS_COST_W1 | The total cost of MMS the week before the analysis | Number | | |
| . . . | | Number | | |
| MMS_COST_Wn | The total cost of MMS n weeks before the analysis | Number | | |

TABLE 2-continued

| Attribute Name | Attribute Description | Type | Is Req | Notes/Issues |
|---|---|---|---|---|
| ET1_NUM_1 | The total number of Event Type 1 the month before the analysis | Number | | |
| ... | | Number | | |
| ET1_NUM_n | The total number of Event Type 1 n months before the analysis | Number | | |
| ET1_COST_1 | The total cost of Event Type 1 the month before the analysis | Number | | |
| ... | | Number | | |
| ET1_COST_n | The total cost of Event Type 1 n months before the analysis | Number | | |
| ET1_NUM_W1 | The total number of Event Type 1 the week before the analysis | Number | | |
| ... | | Number | | |
| ET1_NUM_Wn | The total number of Event Type 1 n weeks before the analysis | Number | | |
| ET1_COST_W1 | The total cost of Event Type 1 the week before the analysis | Number | | |
| ... | | Number | | |
| ET1_COST_Wn | The total cost of Event Type 1 n weeks before the analysis | Number | | |
| INTERNATIONAL_COST_1 | The total cost of International usage the month before the analysis | Number | | |
| ... | | Number | | |
| INTERNATIONAL_COST_n | The total cost of International usage n months before the analysis | Number | | |
| NATIONAL_COST_1 | The total cost of National usage the month before the analysis | Number | | |
| ... | | Number | | |
| NATIONAL_COST_n | The total cost of National usage n months before the analysis | Number | | |
| LOCAL_COST_1 | The total cost of Local usage the month before the analysis | | | |
| ... | | | | |
| LOCAL_COST_n | The total cost of Local usage n months before the analysis | | | |
| MOBILE_COST_1 | The total cost of Mobile usage the month before the analysis | | | |
| ... | | | | |
| MOBILE_COST_n | The total cost of Mobile usage n months before the analysis | | | |
| SPECIAL_NUM_COST_1 | The total cost of Special Number usage the month before the analysis | | | |
| ... | | | | |
| SPECIAL_NUM_COST_n | The total cost of Special Number usage n months before the analysis | | | |
| TOLL_FREE_COST_1 | The total cost of Toll Free usage the month before the analysis | | | |
| ... | | | | |
| TOLL_FREE_COST_n | The total cost of Toll Free usage n months before the analysis | | | |
| INTERNATIONAL_VOL_1 | The total minutes of International usage the month before the analysis | Number | | |
| ... | | Number | | |
| INTERNATIONAL_VOL_n | The total minutes of International usage n months before the analysis | Number | | |

TABLE 2-continued

| Attribute Name | Attribute Description | Type | Is Req | Notes/Issues |
|---|---|---|---|---|
| NATIONAL_VOL_1 | The total minutes of National usage the month before the analysis | Number | | |
| . . . | | Number | | |
| NATIONAL_VOL_n | The total minutes of National usage n months before the analysis | Number | | |
| LOCAL_VOL_1 | The total minutes of Local usage the month before the analysis | | | |
| . . . | | | | |
| LOCAL_VOL_n | The total minutes of Local usage n months before the analysis | | | |
| MOBILE_VOL_1 | The total minutes of Mobile usage the month before the analysis | | | |
| . . . | | | | |
| MOBILE_VOL_n | The total minutes of Mobile usage n months before the analysis | | | |
| SPECIAL_NUM_VOL_1 | The total minutes of Special Number usage the month before the analysis | | | |
| . . . | | | | |
| SPECIAL_NUM_VOL_n | The total minutes of Special Number usage n months before the analysis | | | |
| TOLL_FREE_VOL_1 | The total minutes of Toll Free usage the month before the analysis | | | |
| . . . | | | | |
| TOLL_FREE_VOL_n | The total minutes of Toll Free usage n months before the analysis | | | |
| SPECIAL_NUMBER | The total usage minutes of special numbers call | Number | | |
| TOLL_FREE | The total usage minutes of toll free call | Number | | |
| REV_AMOUNT_1 | The total amount of revenue the month before the analysis | Number | | |
| . . . | | Number | | |
| REV_AMOUNT_n | The total amount of revenue n months before the analysis | Number | | |
| DISC_AMOUNT_1 | The total amount of revenue the month before the analysis | Number | | |
| . . . | | Number | | |
| DISC_AMOUNT_n | The total amount of revenue n months before the analysis | Number | | |
| RECHARGES_NUM_TOT | Number of the recharge during the analysis period | | | |
| RECHARGES_NUM_AVG | Average monthly number of recharges | | | |
| NUM_DAYS_AFTER_LAST_RECHARGE | Number of days spent since the last recharge for the customer | | | |
| AVG_INTRATIME_RECHARGE | Average number of days spent between two different recharges | | | |
| MAX_INTRATIME_RECHARGE | Max number of days spent between two different recharges | | | |
| CONT_TEC_AREA | The number of contacts of each Customers related to the Tec. Area | | | |
| CONT_CUST_CARE | The number of contacts of each Customers related to the Customer Care | | | |
| CONT_BILLING_AREA | The number of contacts of each Customers related to the Billing Area | | | |

TABLE 2-continued

| Attribute Name | Attribute Description | Type | Is Req | Notes/Issues |
|---|---|---|---|---|
| CONT_PROV_AREA | The number of contacts of each Customers related to the Provisioning Area | | | |

Figure 9:
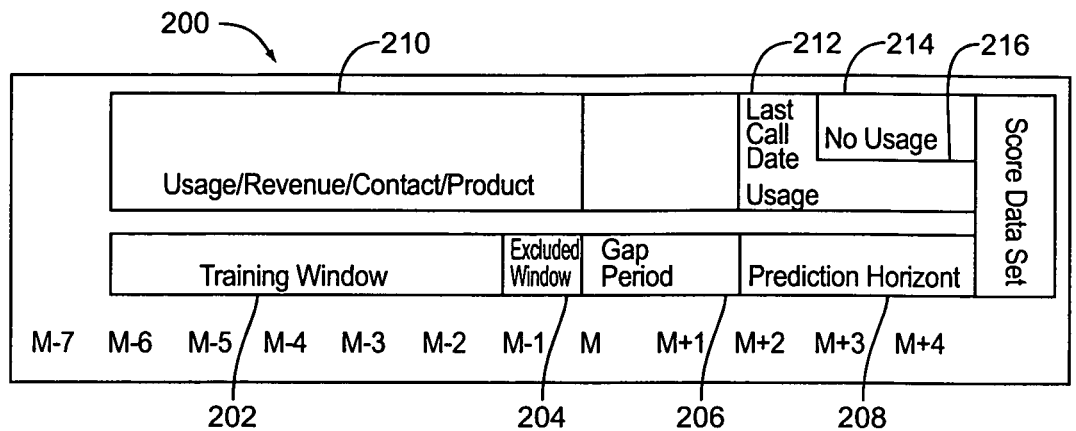
FIG. 9 is a historical data set for training a predictive model.

Another preliminary task that must be performed before the data mining tool can be applied to current data to predict churn in the future is to train the models 136. The predictive models are trained on historical data sets for which the results (i.e. whether individual customers churned or did not churn during a specified prediction window) are already known. FIG. 9 illustrates the structure of a typical data set 200. The data set 200 containing usage, revenue, contact and product data (essentially all of the variable in the predictive modeling cars prepared by the date manipulation module 114) from each customer in the customer base. The data set 200 has a granularity of one month corresponding to the one month billing cycle of most telecommunications service providers and other enterprises. New data are received each month and made available for the churn prediction analysis. Several months worth of data are applied to the analysis. Data set 200 has a six month aggregation level. In other words, data set 200 includes six months worth of aggregate usage information for each customer in the database.

The data set 200 corresponds to an embodiment of the invention in which churn has been defined as two consecutive months of customer inactivity. According to this definition, the determination that a customer has churned cannot be made until two months after the customer's last recorded activity.

In the embodiment shown in FIG. 9, the analysis window is divided into a number sub-periods, including training window 202, excluded window 204, gap period 206, and prediction horizon 208. Month M represents the data collection and analysis period. Recall that the data set 200 represents historical data. If the prediction model were being deployed on current "live" data to make churn predictions for the future, month M would represent the current month of the enterprise's billing cycle. In the data set 200, however, the month M represents the month during which the data were collected as if it were the current month of the billing cycle. The months M−1 through M−6 mark the six months prior to M and M+1 through M+4 the four months following M.

When operating on "live" data the data for the month M in which the data set is collected are not available because the full month's worth of data would not be complete until the end of the month. Therefore, in the historical data set 200, the data for the month M, though technically available since it was accumulated some time in the past, is withheld from the training set in order to be consistent with the conditions under which the model will actually be deployed.

Because of the definition of churn it will take two months to detect a churn event after a customer's last recorded activity. Since data from month M is excluded, churn events cannot be detected prior to the start of month M+2. Thus, a gap period 206 extends from M through M+1. Since the prediction model is being trained to predict churn in the months following M based on data accumulated in the months preceding M, the data set 200 includes customer data from each of the six months M−1 through M−6 preceding M. The last aggregated data before the analysis period M may be excluded to in order to avoid processing data that is too highly correlated with the target variable. Thus, the excluded window 204 is shown in month M−1. Finally, the model is to have a three month prediction window. Because of the gap period 206, the prediction horizon cannot begin before M+2 and extends through the end of M+4.

In order to ensure as many observations of the churn phenomenon as possible, and to ensure that a full complement of historical data are available to analyze each churn event, the data set is limited to customer data from only those customers who activated their service before the start of the analysis window, i.e. before M−6, and customers who placed at least one call during the prediction window.

The upper portion of FIG. 9 represents the actual data included in data set 200. The aggregated data 210 from the previous months M−1 to M−6 represents the accumulated data for each customer in the database. The data include customer usage, revenue, contact, product data and the like. Over 300 variables are included, corresponding to the predictive modeling customer analytic record (CAR) shown in Table 4. FIG. 9 shows two possible results. One where the customer churns 214, and one where the customer does not churn 216. In the case where the customer does not churn 216 the data indicates customer usage throughout the prediction horizon 208. In contrast, where churn is detected 214, the customer's last recorded activity 212 occurs in month M+2, and no activity is recorded in months M+3 and M+4. According to the selected definition of churn, the two consecutive months of no activity in M+2 and M+4 indicate that the customer was churned.

Figure 10:
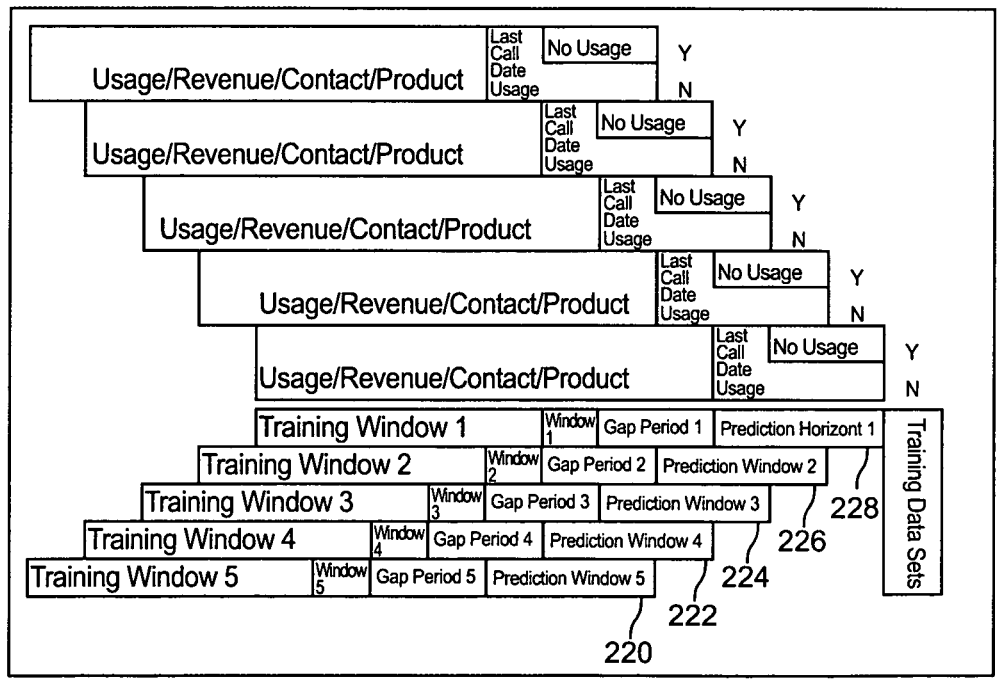
FIG. 10 shows a plurality of staggered historical data sets for training a predictive model.

According to an embodiment of the invention, the models are trained using multiple overlapping data sets as shown in FIG. 10. The data sets 220, 222, 224, 226, 228 are offset by one month increments. The results from training the model on a first data set 220 are included when training the model on the second data 222, and so forth in an iterative process which refines the predictive power and accuracy of the model with each iteration. Training the models on data from a plurality of overlapping data sets increases the number of churn events that may be analyzed and weakens seasonal effects. The exact number of data sets used to train the models may vary depending on the availability of data, data obsolescence and other factors.

Returning to FIG. 3, once a model is trained at 136, the results are verified at 138. The accuracy of the model is validated by applying a last set of historical data to the trained model and comparing the results of the prediction against the actual historical results. The model is accepted if the results of the validation set are very similar with the expected results of the created model. For example, assume that the training phase generated a model that can identify 50% of the churners in the first 10% of the population, and 92% of churners in the first 30% of the population. The model is successfully validated if the first 10% of customers with highest churn propensity (as calculated by the model) contains 50% of the actual churners and the first 30% contains 92% of churners. If the validation presents results which are different from the training phase (better or worse), the model is not stable and has to be re-trained under different conditions (different selection of input variables, different statistical algorithm or different tuning of the same statistical algorithm). The validation phase is not aimed at optimizing the predictive power of the model, but rather verifying the model's stability across a different input set. A stable performance of the model during the validation phase allows users to trust the results of the model when it is applied to other "live" data sets (e.g. active customers who are to be scored on a monthly basis for selecting the targets for retention campaigns).

To ensure the independence of the validation step, the data set applied to validate the model must not be among the data sets used to train the model. If the results are satisfactory, the model may be deployed on live data. If not the model may be scrapped.

Once the models have been trained at 136 and the results verified at 138, the models are deployed at 140. Deploying the models 140 involves applying current data to the models and performing the clustering and churn propensity scoring on the current data. According to the embodiment shown in FIG. 2, the data manipulation module 114 prepares customer analytic records (CARs) for identifying behavior related clusters, value related clusters and for churn prediction scoring. The results of the clustering may be displayed in the reports 120 provided by the end use access module 118, which may be analyzed by marketing personnel or other business intelligence consumers with an interest in designing a customer retention program or strategy. The churn prediction results may be applied toward generating the customer retention target list.

The clustering function identifies significant groupings of customers based on common attributes. As mentioned above, different types of customer characteristics may be investigated by feeding different types of customer data to the data mining tool. For example, the data manipulation module 114 shown in FIG. 1 assembles different CARs for identifying significant clusters based on customer behavior variables or customer value variables. Behavior variables may include traffic volume, international wireless traffic and the like, usage patterns while clusters based on value variables may include revenue, costs, and the like. Once clusters have been identified and customers assigned to appropriate clusters, the clusters may be combined in multi-dimensional cluster arrays for further probing the customer data. For example multi-dimensional clusters may compare the number of churned customers among customers classified according to a specific behavioral characteristic and a specific value characteristic. The data mining tool identifies which clusters are significant, and the clusters may be compared against any of the variables in the data set so that the data mining tool provides a complete multi-dimensional view of the customer population. By analyzing churn among a wide range of customer groupings based on both behavior and value characteristics it is possible to develop a more detailed strategy for addressing churn. For example, the clustering analysis may provide deeper insights into customer loyalty drivers among specific elements within its customer population. Armed with such knowledge, the enterprise may improve both acquisition and retention efforts by tailoring its offerings or retention efforts to meet the specific needs and concerns of diverse groups within the general customer population.

Figure 11:
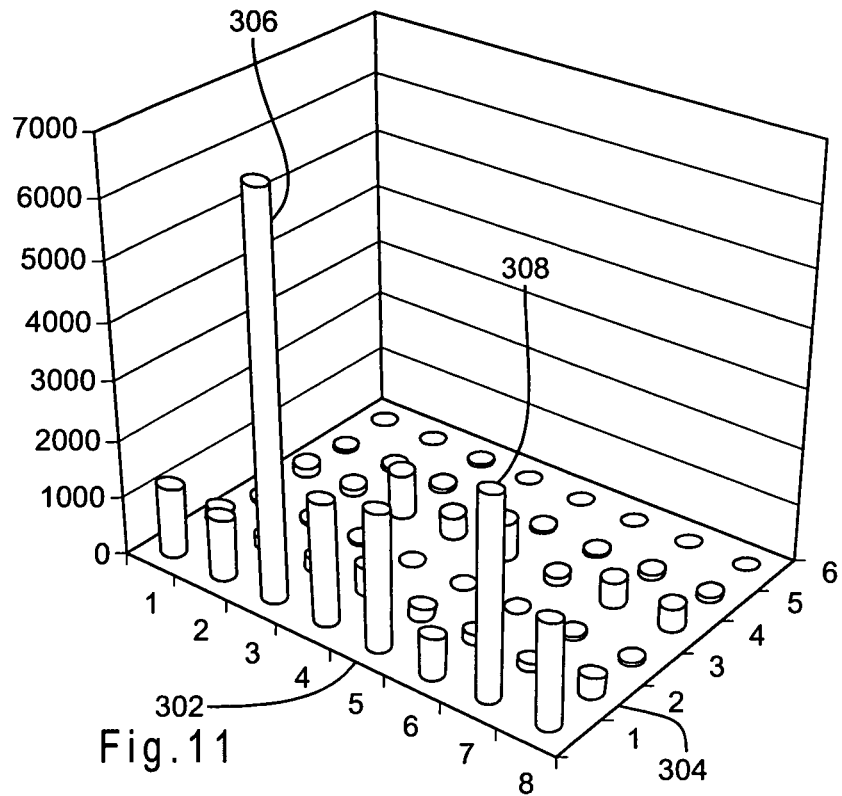
FIG. 11 is a graphical report showing customer clusters based on a behavioral variable and a value variable.
Figure 12:
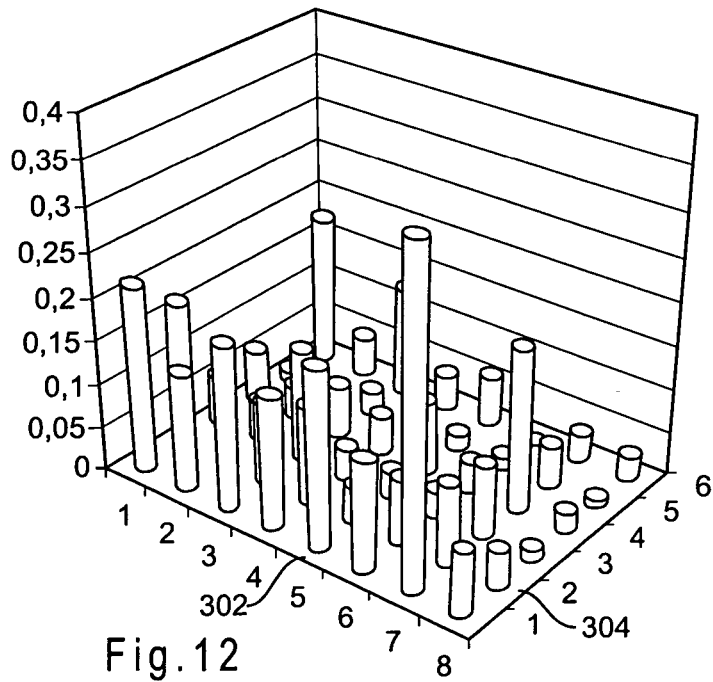
FIG. 12 is a report showing the number of churns customers in clusters based on a behavior variable and a value variable.
Figure 13:
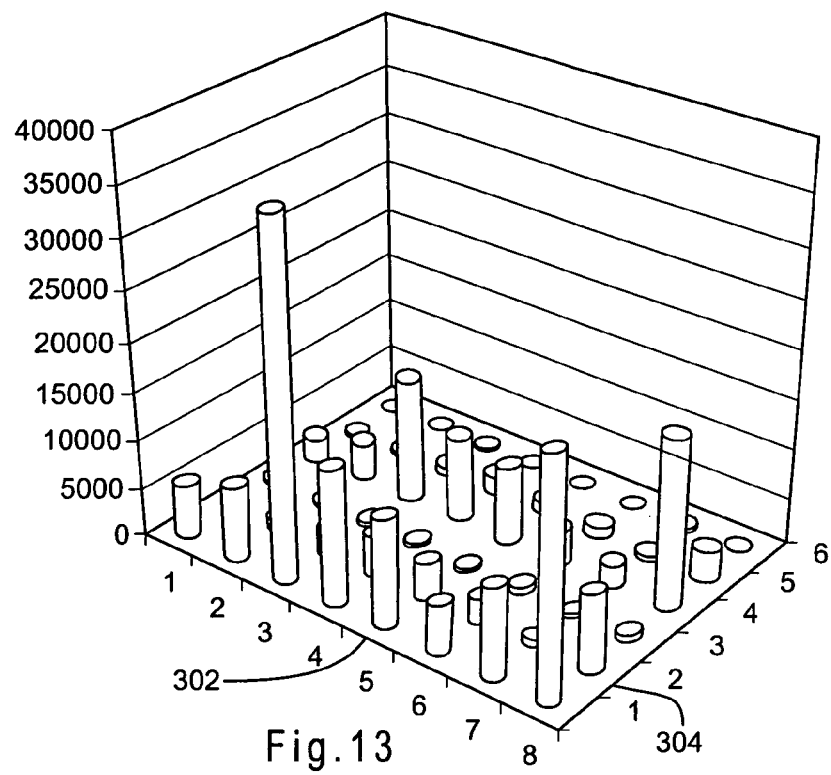
FIG. 13 is a graphical report showing the average churn rate of clusters based on a behavior variable and a value variable.

In conjunction with the reporting capabilities of the end user access module 118, the clustering function can provide powerful visual aids to understanding the forces that drive customer behavior and value. For example, FIGS. 11-13 show various three-dimensional plots generated from the clustering results. The plots show customer distributions based on 3 separate variables. A first variable 302 may be a behavior variable such as customer distribution based on percentage of international calls, percentage of non-peak calls, or any other of behavior type variable supplied to the data mining tool for cluster analysis. Similarly, a second variable 304 may be a value variable such as the distribution of customers according to revenue class, profitability, or the like. FIG. 11 shows the distribution of the entire customer population according to the behavior variable 302, and the value variable 302. For purposes of the present discussion, we will assume that the behavior variable 302 represents volume of on-peak calls, and the variable represents average months revenue. According to FIG. 11, most customers are low revenue customers. The most significant group 306 are low revenue customers with relatively low volume of on-peak calls. Another significant group 308 is also low revenue, but also has a relatively high rate of on-peak calls. FIG. 12 shows the number of churned customers across the same behavior and value variables 302 and 304 as shown in FIG. 11. FIG. 13 shows the average churn rate for the same variables 302 and 304. Such multi-dimensional clusters can be defined for substantially any descriptive variable found in the customer data base.

Whereas the clustering function is geared toward learning more about the churn phenomenon and understanding the characteristics of customers within the customer population, the predictive modeling is geared toward identifying the customers who are most likely to churn in the future. To that end, each customer is scored according to his or her individual propensity to churn. Customer retention programs may be directed toward customers having the highest propensities to churn. The churn propensity scores may be further filtered by other parameters so that highly targeted campaigns may be enacted. By concentrating efforts on the customers must likely to churn, many more likely churners may be contacted in the course of contacting fewer customers.

Based on the clustering and scoring, the targets for a customer retention program are defined at 142. In general, the defined targets will be the customers having characteristics indicating a high propensity to churn (i.e. belonging to clusters known to have had a high churn rate in the past) and customer having the highest propensity to churn scores. Optionally, the retention target list may be refined using criteria other than churn propensity. For example, the process shown in FIG. 3 includes the optional task of determining each individual customer's overall value 146. Based on their customer lifetime value it may be desirable to allow, or even encourage, some non-profitable customers to churn. On the other hand, extraordinary measures may be called for to retain the most valuable customers. This information may be used to limit retention targets to profitable or the most valuable customers. By evaluating retention targets based on profitability and value it is possible for the enterprise to concentrate its retention efforts on customers whose loss would entail the most significant negative financial impact.

Finally, once all of the criteria have been established for defining the customers to be targeted, the final task 144 is to specifically identify the customers who meet the criteria and compile a customer retention target list. The customers identified in the retention target list may be provided to an automated system for implementing a customer retention program, or provided to personnel responsible for implementing such a program.

Figure 14:
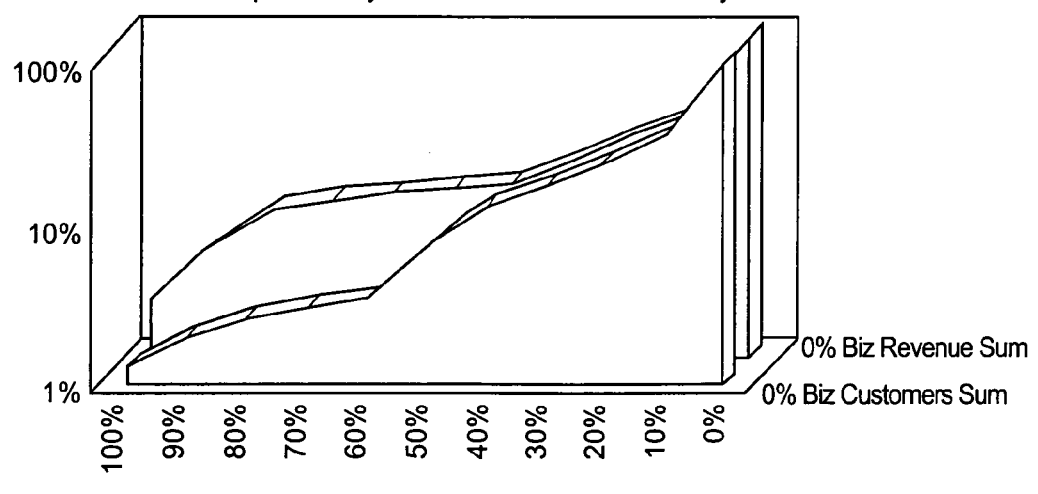
FIG. 14 is a graphical report showing the percentage of business customers and the percentage of business revenue impacted by potential churn plotted against churn probability.

The end result of implementing a churn prediction and management program as outlined in the flow chart of FIG. 3 is to develop a better understanding of the causes of churn and of the characteristics of customers who will likely churn in the future and to generate a target list of the most likely future churners. By attaining a better understanding of the reasons for churn, and identifying the most likely churners, the enterprise may implement a much more efficient and much more affective customer retention program. Once the individual customers have been scored according to their propensity to churn it is possible to get a very clear picture of the potential impact churn may have on the business. Once the customers have been scored, it is possible to calculate their distribution based on their churn propensity. Customers may be classified according to their position within the distribution and the percentage of total revenue represented by the customers in each class may be calculated. Table 5 shows the results of such calculations for a particular data set. The results are shown in graphical form in FIG. 14. The table and/or graph may be compiled by the end user access module 118 of FIG. 2 using data stored in the data mart 110. Table 5 lists churn probabilities for business customers of a telecommunications service provider. The table lists churn probabilities in 10% increments starting at 100% and moving down. Customers having a 100% churn probability are the most likely to churn and those having a 0% score are the least likely to churn. The second column lists the percentage of the business customer base having a corresponding churn propensity. The third column show the percentage of overall business revenue generated by the class of customers having the corresponding churn probability. For example, 1.30% of business customers are in the class of business customers having a 100% churn probability score. These customers are responsible for 2.43% of business revenue. 20% of business customers have a churn probability score of 90% or more. These customers represent 5.19% of the revenue generated by business customers. The graph in FIG. 15 illustrates the point that although the number of business customers having a high propensity to churn is relatively small, they represent a disproportionate share of the enterprise's revenues. By targeting the relatively small number of customers having a high propensity to churn in a customer retention program, the enterprise can protect a significant portion of its revenue. For example contacting business customers having a 60% churn probability or above requires containing only 3.4% of the overall business customer base. However if the enterprise is successful in preventing these customers from churning, the enterprise will retain 10.71% of the revenue it would otherwise have lost.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for managing churn among customers of a business having a statistically large customer base, the system comprising:
    a memory device configured to store a data mart;
    a processor in communication with the memory device;
    a population architecture executable by the processor to receive customer data from one or more data sources stored in the data mart, the customer data defining a plurality of customer attributes for each customer in the customer base;
    a data manipulation module executable by the processor to:
    calculate derived variable values based on the customer data, wherein each of the derived variable values is indicative of at least one customer characteristic;
    select a subset of the derived variable values in response to a preselected data mining function; and
    generate at least one analytical record containing the subset of the derived variable values, wherein the at least one analytical record is associated with a plurality of customers;
    a data mining tool executable by the processor to perform the preselected data mining function, the preselected data mining function configured to:
    analyze the at least one analytical record;
    return results identifying clusters of customers sharing common customer attributes in response to the analysis of the at least one analytical record; and
    calculate, based on the at least one analytical record, individual customers' propensities to churn during a predefined period in the future, the data manipulation module storing the results in the data mart; and
    an end user access module executable by the processor to:
    access the results returned from the data mining tool; and
    present the results to a user.

2. The system for managing churn of claim 1 wherein the data mining tool comprises an SAS Enterprise Miner.

3. The system for managing churn of claim 1 wherein the data mining tool comprises a KXEN data mining tool.

4. The system for managing churn of claim 1 wherein the subset of derived variable values included in the analytical record are selected to provide customer behavioral data to the data mining tool, and wherein the data mining tool is further executable by the processor to identify significant clusters of customers based on common behavioral characteristics.

5. The system for managing churn of claim 1 wherein the subset of derived variable values included in the analytical record are selected to provide customer value data to the data mining tool, and wherein the data mining tool is further executable by the processor to identify significant clusters of customers based on common value characteristics.

6. The system for managing churn of claim 1 wherein the subset of derived variable values included in the analytical record are selected to provide customer data to the data mining tool, and wherein the data mining tool is further executable by the processor to calculate individual customers' propensities to churn based on the subset of derived variable values.

7. The system for managing churn of claim 1 wherein the end user access module is further executable by the processor to generate one or more reports configured to analyze churn based on customer data stored in the data mart.

8. The system for managing churn of claim 7 wherein a report compares active customers to churned customers.

9. The system of claim 7 wherein the end user access module is further executable by the processor to:
    calculate a churn rate from historical data; and
    generate a report that illustrates the churn rated versus classes of customers defined according to customer distribution relative to a selected customer attribute.

10. The system of claim 7 wherein the end user access module is further executable by the processor to:
    calculate a churn rate; and
    generate a report that illustrates the churn rate for a cluster of customers.

11. The system of claim 7 wherein the end user access module is further executable by the processor to:
    calculate a churn rate; and
    generates a report that illustrates the churn rate versus a first behavioral cluster variable, and a second value cluster variable.

* * * * *